(12) United States Patent
Roth

(10) Patent No.: US 11,014,501 B2
(45) Date of Patent: May 25, 2021

(54) REARVIEW ASSEMBLY

(71) Applicant: Gentex Corporation, Zeeland, MI (US)

(72) Inventor: Mark R. Roth, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 168 days.

(21) Appl. No.: 16/171,441

(22) Filed: Oct. 26, 2018

(65) Prior Publication Data

US 2019/0126830 A1 May 2, 2019

Related U.S. Application Data

(60) Provisional application No. 62/577,936, filed on Oct. 27, 2017.

(51) Int. Cl.
*B60R 1/12* (2006.01)
*B60R 1/04* (2006.01)

(52) U.S. Cl.
CPC .................. *B60R 1/12* (2013.01); *B60R 1/04* (2013.01); *B60R 2001/1215* (2013.01); *B60R 2001/1253* (2013.01)

(58) Field of Classification Search
CPC ..... B60R 1/04; B60R 1/12; B60R 2001/1215; B60R 2001/1253
USPC ....................................................... 359/871
See application file for complete search history.

(56) References Cited

U.S. PATENT DOCUMENTS

| | | | |
|---|---|---|---|
| 4,476,356 A | 10/1984 | Nakayama et al. | |
| 4,499,342 A | 2/1985 | Nakayama | |
| 5,128,500 A | 7/1992 | Hirschfeld | |
| 5,579,002 A | 11/1996 | Iggulden et al. | |
| 6,091,831 A | 7/2000 | Cho | |
| 6,243,003 B1 | 6/2001 | DeLine et al. | |
| 6,407,468 B1 * | 6/2002 | LeVesque | B60R 1/088 307/10.1 |
| 6,420,800 B1 | 7/2002 | LeVesque et al. | |
| 6,471,362 B1 | 10/2002 | Carter et al. | |
| 7,230,196 B2 | 6/2007 | Toyama | |
| 7,266,204 B2 | 9/2007 | Watson et al. | |
| 7,527,403 B2 | 5/2009 | Uken | |
| 10,406,982 B2 * | 9/2019 | Hooper | B60R 1/1207 |
| 10,664,115 B2 * | 5/2020 | Lindahl | B60R 1/12 |
| 2004/0011635 A1 | 1/2004 | Adams | |
| 2005/0169003 A1 * | 8/2005 | Lindahl | G06F 3/0488 362/494 |
| 2010/0091394 A1 | 4/2010 | DeWind et al. | |

(Continued)

FOREIGN PATENT DOCUMENTS

JP 2005164145 A 6/2005
WO 199428634 A1 12/1994

*Primary Examiner* — Ricky D Shafer

(74) *Attorney, Agent, or Firm* — Price Heneveld LLP; Bradley D. Johnson

(57) ABSTRACT

A rearview assembly includes a housing configured to support a rearview device. A button is disposed on a side of the housing and includes a proximal end adjacent the rearview device. A distal portion is spaced from the rearview device. A switch is proximate the distal portion of the button. Actuation of the switch activates a function of the rearview device. The requisite force to actuate the button decreases as the force is moved from the proximal end of the button to the distal portion. The switch is in abutting contact with the housing at the proximal end and is spaced from the housing by a gap at the distal portion.

14 Claims, 9 Drawing Sheets

(56) References Cited

U.S. PATENT DOCUMENTS

2013/0194650 A1* 8/2013 Roth .................. B60R 1/02
                                                        359/267
2015/0085391 A1   3/2015 Hooper et al.

\* cited by examiner

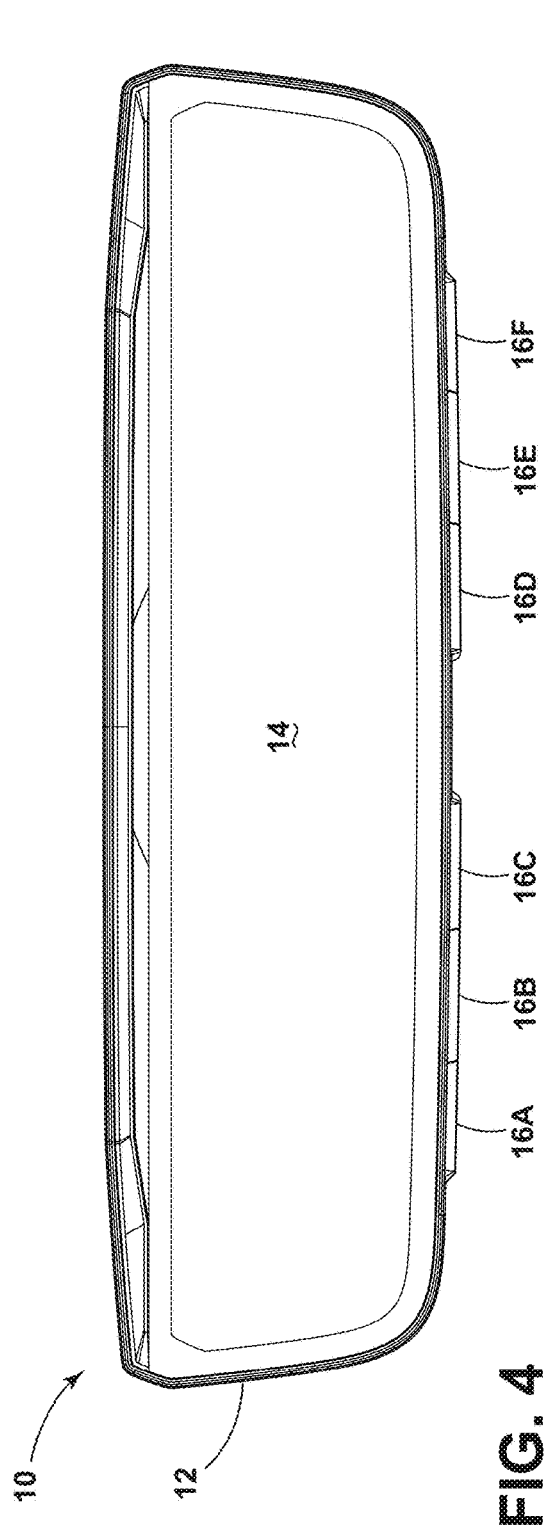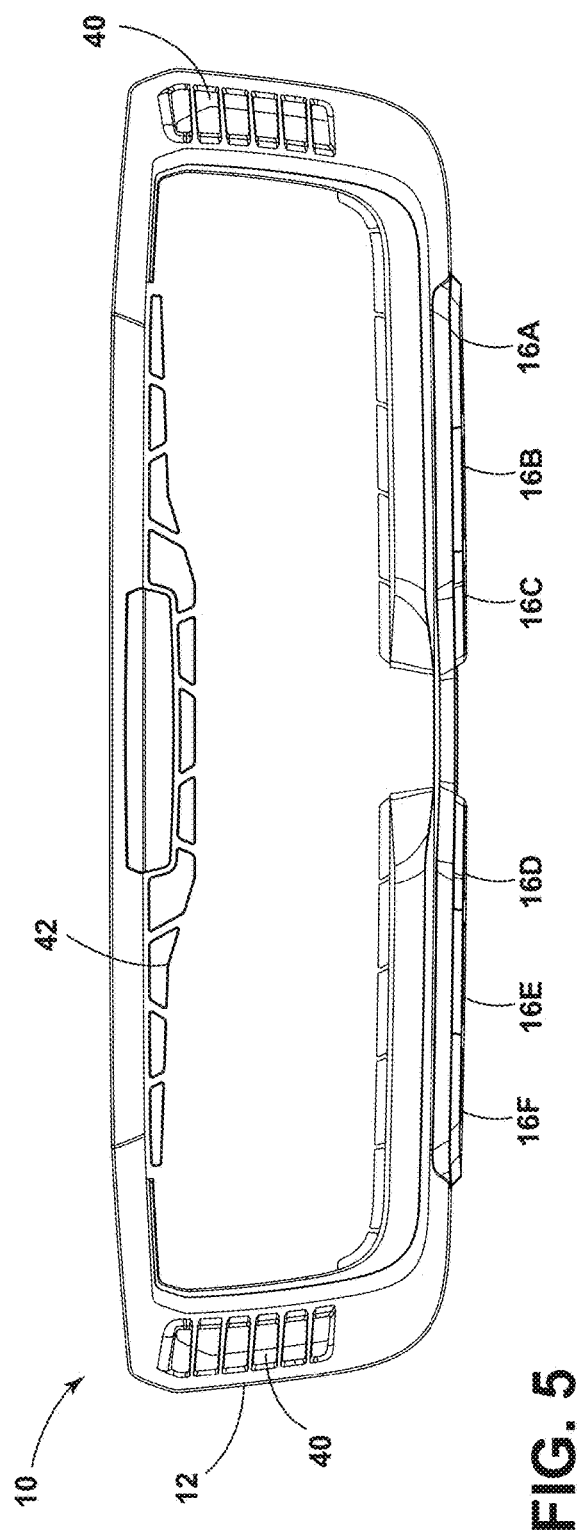

REARVIEW ASSEMBLY

CROSS-REFERENCE TO RELATED APPLICATION

This application claims priority to and the benefit under 35 U.S.C. § 119(e) of U.S. Provisional Application No. 62/577,936, filed on Oct. 27, 2017, entitled "REARVIEW ASSEMBLY," the disclosure of which is hereby incorporated herein by reference in its entirety.

FIELD OF THE DISCLOSURE

The present disclosure generally relates to a rearview assembly, and more particularly to a rearview assembly having rearwardly actuatable buttons.

SUMMARY OF THE DISCLOSURE

According to one aspect of the present disclosure, a rearview assembly includes a housing configured to support a rearview device. A button is disposed on a side of the housing and includes a proximal end adjacent the rearview device. A distal portion is spaced from the rearview device. A switch is proximate the distal portion of the button. Actuation of the switch activates a function of the rearview device. The requisite force to actuate the button decreases as the force is moved from the proximal end of the button to the distal portion. The switch is in abutting contact with the housing at the proximal end and is spaced from the housing by a gap at the distal portion.

According to another aspect of the present disclosure, a rearview assembly includes a housing configured to support a rearview device. A button is disposed on a side of the housing and includes a proximal end adjacent the rearview device. A distal portion is spaced from the rearview device. A connecting member generally defines a fulcrum that is operably coupled with the button adjacent the proximal end of the button. Application of force to the distal portion facilitates actuation of the button and activation of a function of the rearview assembly.

According to yet another aspect of the present disclosure, a rearview assembly includes a housing configured to support a rearview device. A button assembly includes a plurality of buttons disposed on a side of the housing. Each of the plurality of buttons includes a proximal end adjacent the rearview device and a distal portion proximate a rear wall of the rearview device. A switch assembly includes a plurality of switches proximate the distal portion of each of the plurality of buttons. Activation of the switch assembly activates a function of the rearview device. A requisite force to actuate the button assembly decreases as the force is moved from the proximal end of the each of the plurality of buttons to the distal portion.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4 is a front elevational view of the rearview assembly of FIG. 1;

FIG. 5 is a rear elevational view of the rearview assembly of FIG. 1;

DETAILED DESCRIPTION

Figure 1:
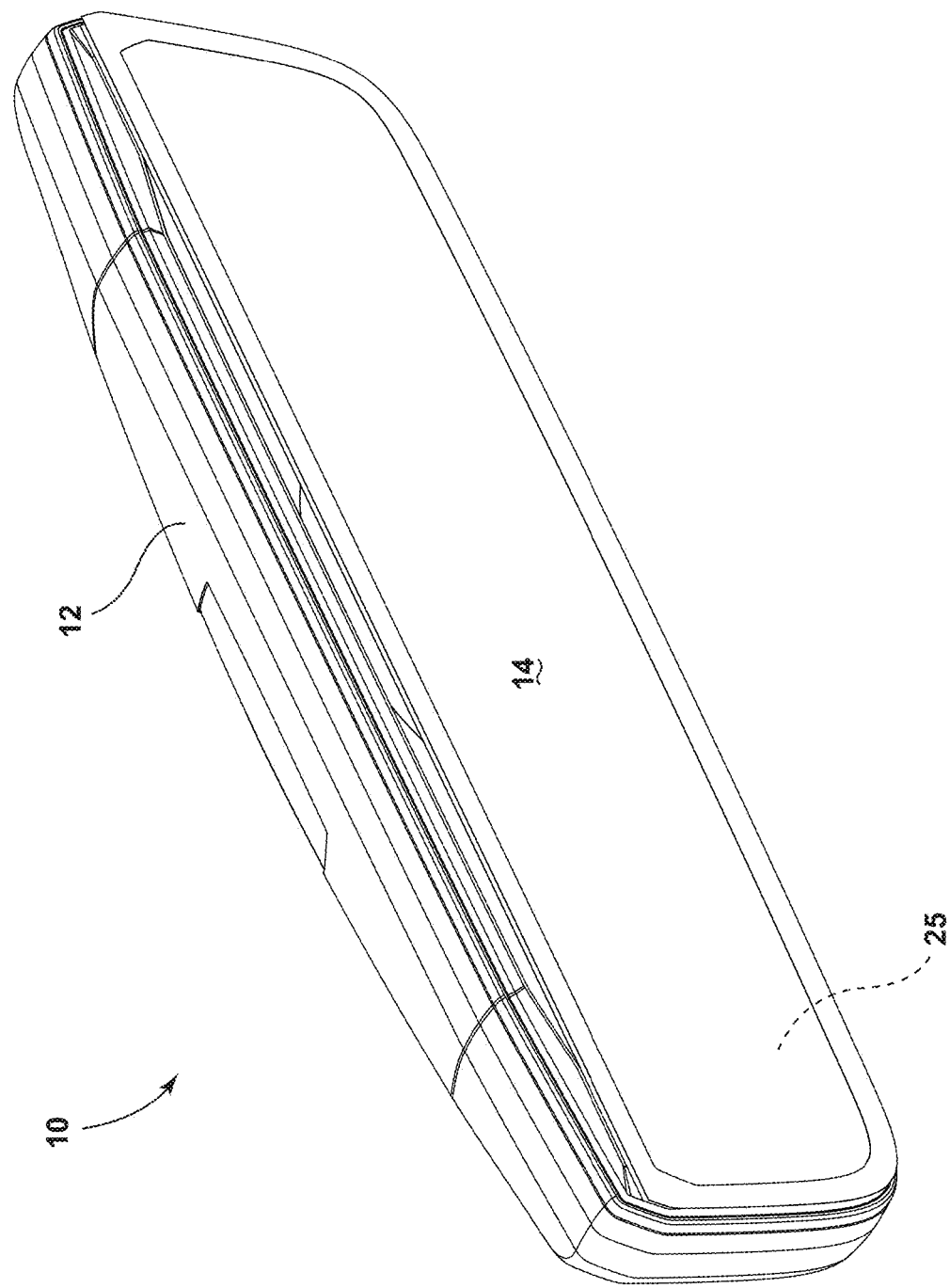
FIG. 1 is a top perspective view of a rearview assembly of the present disclosure.
Figures 2, 3:
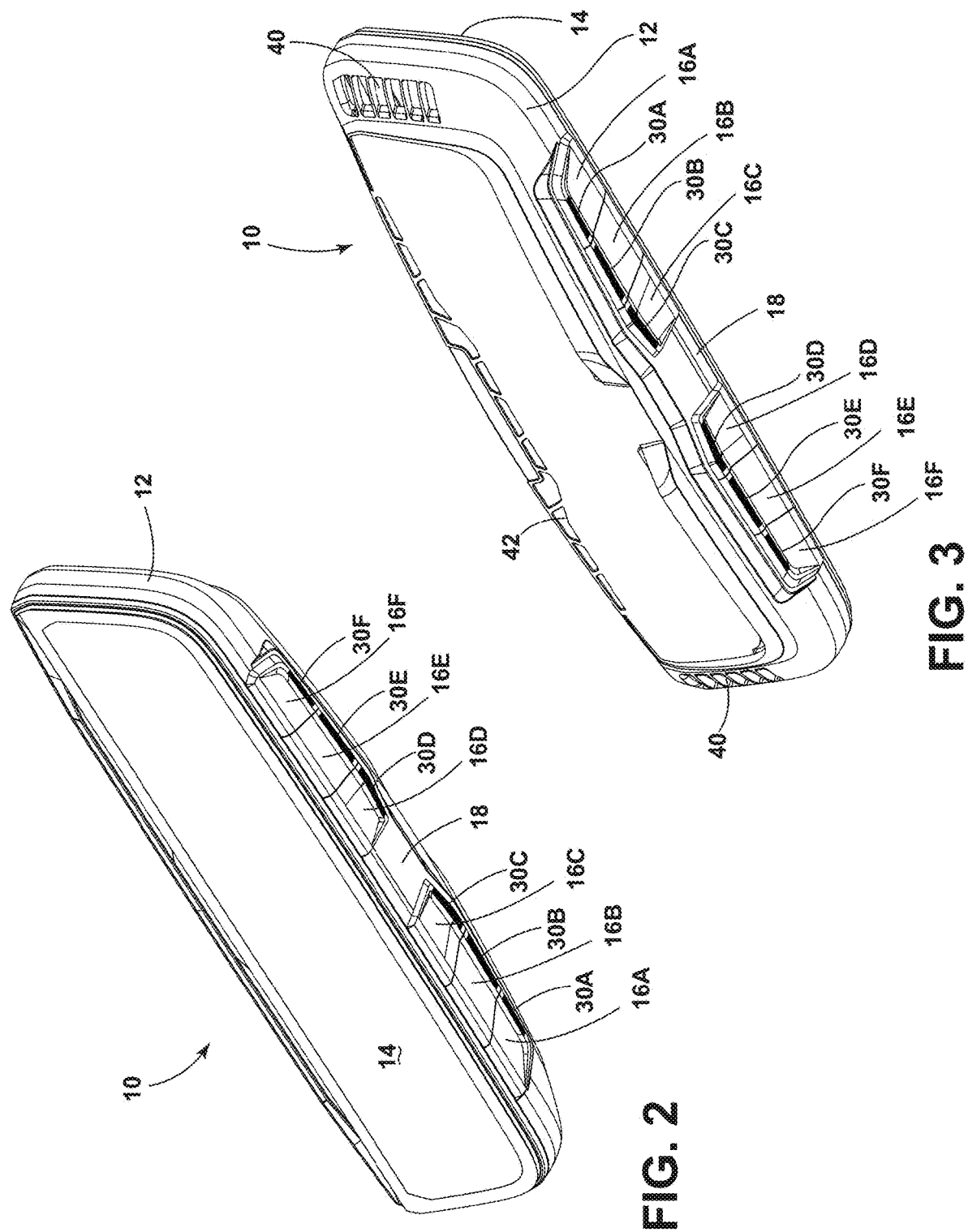
FIG. 2 is a front bottom perspective view of the rearview assembly of FIG. 1.
FIG. 3 is a rear bottom perspective view of the rearview assembly of FIG. 1.
Figure 6:
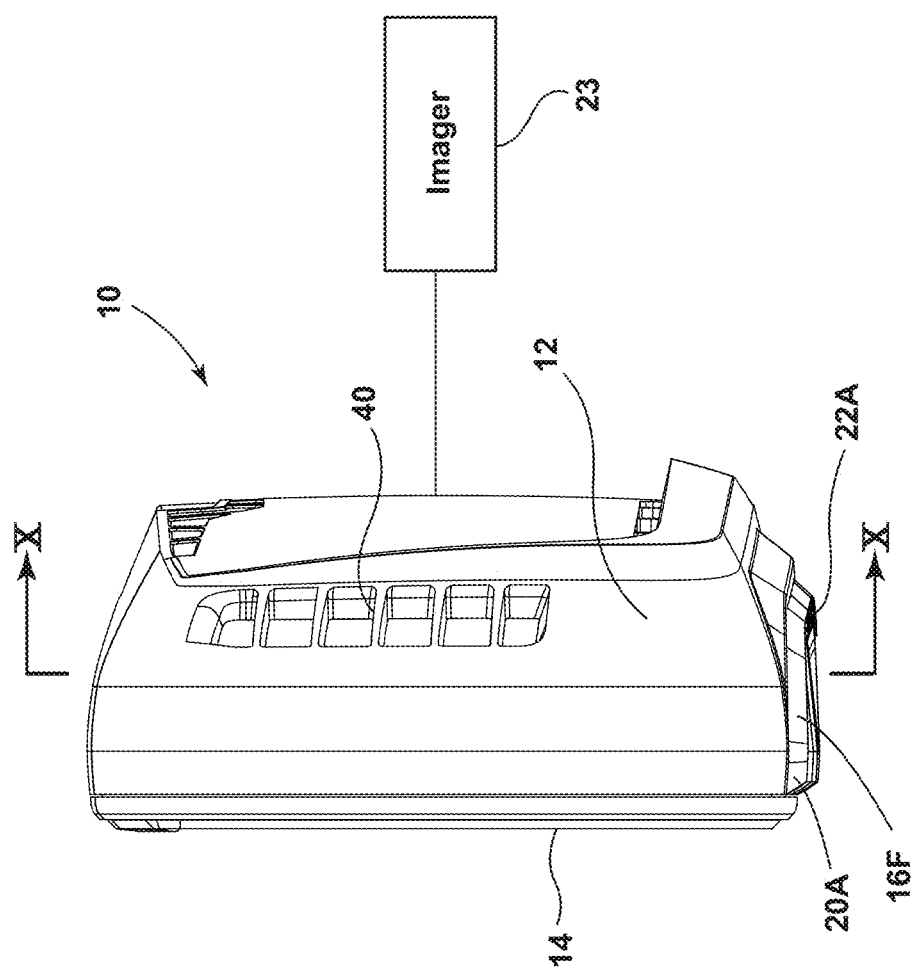
FIG. 6 is a side elevational view of the rearview assembly of FIG. 1.
Figure 7:
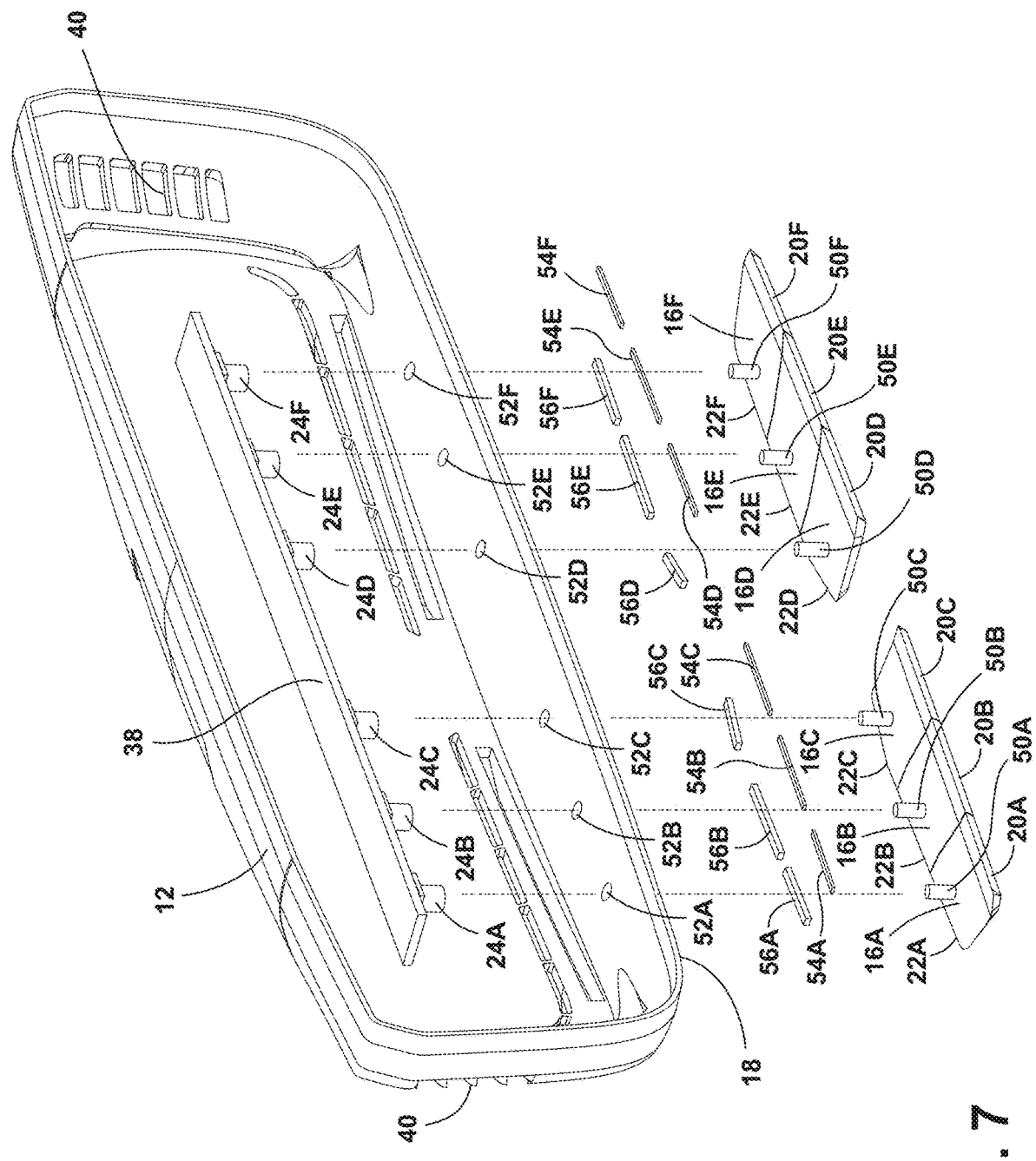
FIG. 7 is a front perspective exploded view of a housing and buttons of the rearview assembly of FIG. 1.
Figure 8:
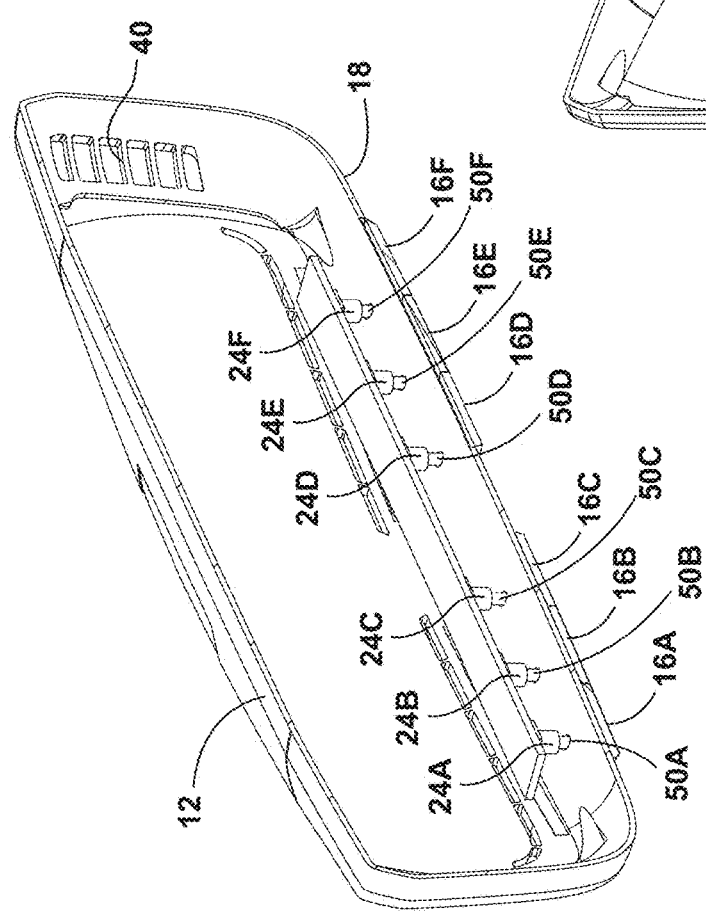
FIG. 8 is a front top perspective view of a housing and buttons of a rearview assembly of the present disclosure.
Figure 9:
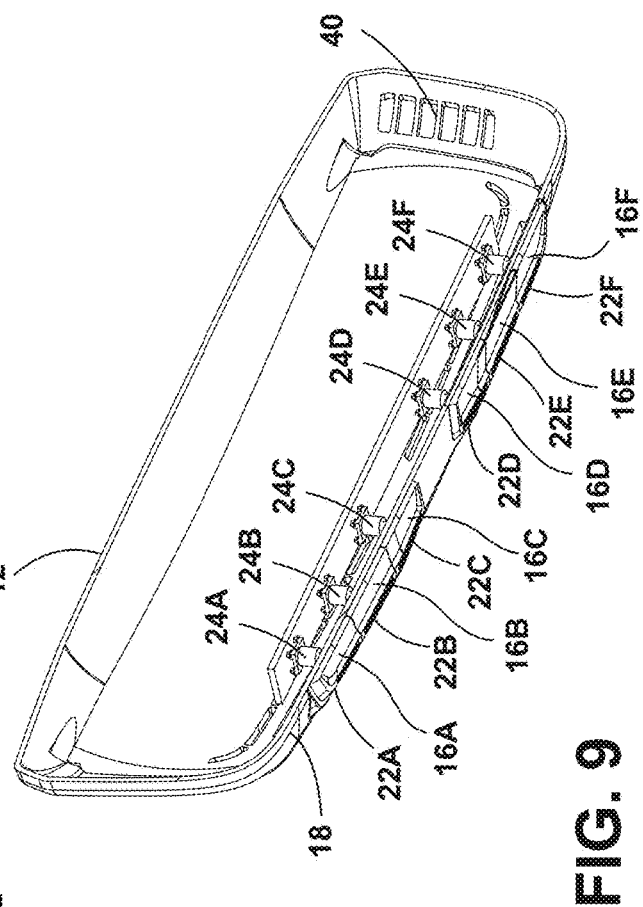
FIG. 9 is a front bottom perspective view of a housing and buttons of a rearview assembly of the present disclosure.
Figure 10:
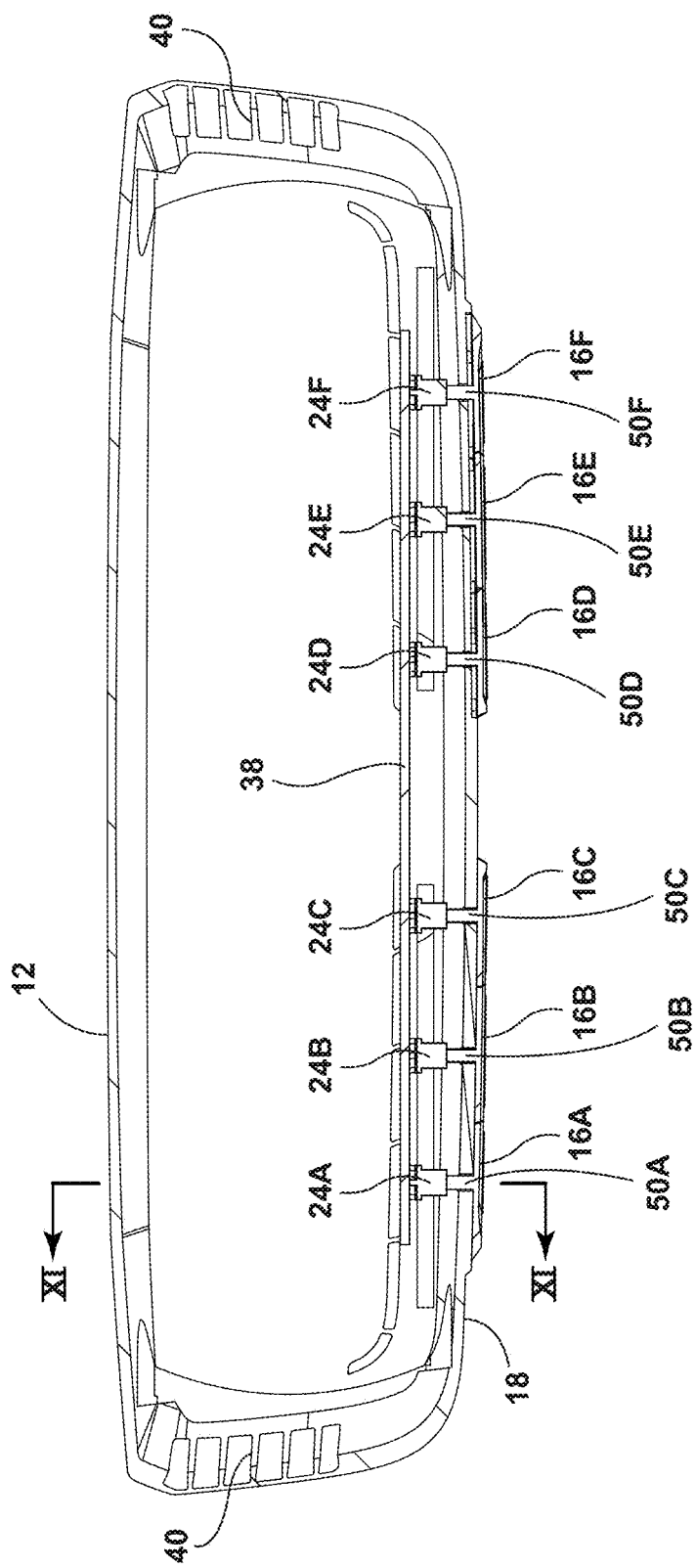
FIG. 10 is a front elevational cross-sectional view of the rearview assembly of FIG. 6 taken at line X-X.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-13, reference numeral 10 generally designates a rearview assembly that includes a housing 12 configured to support a rearview device 14. A button 16A is disposed on a bottom side 18 of the housing 12. The button 16A includes a proximal end 20A adjacent the rearview device 14. A distal portion 22A of the button 16A is spaced from the rearview device 14. A switch 24A is proximate the distal portion 22A of the button 16A. Actuation of the switch 24A activates a function of the rearview device 14. The requisite force to actuate the button 16A decreases as the force is moved from the proximal end 20A of the button 16A to the distal portion 22A.

With reference now to FIG. 1, the rearview device 14 of the rearview assembly 10 may include an electro-optic assembly having autodimming functionality, which may include an electro-optic device, such as an electrochromic element. Alternatively, or in addition, the rearview assembly 10 may include a display module 25 configured to display an image taken by an imager 23 (FIG. 6) of a view exterior to the vehicle or of a view interior to the vehicle. Functionality related to the rearview device 14 may be activated by any one or more of a plurality of buttons 16A-16F disposed on the housing 12. Each of the plurality of buttons 16A-16F includes a tactile indicator 30A-30F, respectively, that generally defines a gripping surface disposed at the distal portion 22A of the button 16A. The tactile indicator 30A is configured to notify a user that the fingers of the user are properly positioned to actuate the button 16A. Each button 16A-16F is configured to actuate a switch 24A-24F when depressed. Each switch 24A-24F is adjacent to or disposed within the housing 12, and is configured to modify functions of the display module 25 and/or the electro-optic device. The buttons 16A-16F are in abutting contact with the bottom side 18 of the housing 12. However, the buttons 16A-16F could also be positioned in voids defined in the bottom side 18 of the housing 12. The switches 24A-24F are operably coupled with a circuit board 38. The circuit board 38 is operably coupled with the rearview device 14 and may be coupled with an electro-optic device or display module.

With reference now to FIGS. 3-6, a rear portion of the housing 12 includes ventilation 40 that assists in minimizing excessive heat gain within the housing 12 during operation of the rearview assembly 10. In addition, structural and ornamental features 42 are also disposed on a rear wall of the rearview assembly 10. It will also be understood that the rearview assembly 10 may be operably coupled with a windscreen via a multitude of different mounting assemblies, including a single ball mount, a dual ball mount, etc.

With reference again to FIG. 6, the plurality of buttons 16A-16F are disposed on the bottom side 18 of the housing 12. However, as previously noted, the plurality of buttons 16A-16F may be located at any portion of the housing 12 and are not limited to the bottom side 18 of the housing 12. In addition, it will be understood that the proximal end 20A-20F of each button 16A-16F is not configured to be actuated. For example, application of force to the button 16A at the proximal end 20A of the button 16A does not generally actuate the button 16A. Thus, the button 16A cannot be accidentally activated while the reflected surface or the display image of the rearview assembly 10 is being adjusted by the user. Generally, a user will grasp the rearview assembly 10 proximate a forward edge of the housing 12 near the rearview device 14. To activate the plurality of buttons 16A-16F, a user will grasp the distal portion 22A of the button 16A proximate the tactile indicator 30A. The distal portion 22A is set back a predetermined distance from the forward edge of the housing 12. The switch 24A within the housing 12 is proximate the distal portion 22A and is readily actuatable upon pressing of the button 16A in a direction toward the housing 12.

With reference now to FIGS. 7-10, one aspect of a button construction of the present disclosure is illustrated. As shown, each button 16A-16F includes an upwardly-extending post 50A-50F that extends through a receiving aperture 52A-52F, respectively. The posts 50A-50F are configured to activate the switches 24A-24F disposed within the housing 12. The proximal end 20A of each button 16A-16F includes a first adhesive member 54A-54F that maintains the button 16A against the housing 12. The distal portion 22A of each button 16A-16F also includes a second adhesive member 56A-56F configured to maintain the distal portion 22A of the button 16A adjacent to an underside of the housing 12. The second adhesive member 56A-56F may include a memory foam or other pliable material capable of rebounding after many compression cycles. A gap 60 is maintained between the distal portion 22A-22F of each button 16A-16F and the housing 12. The gap 60 is lessened or closed when the distal portion 22A-22F of any of the buttons 16A-16F are depressed. As an example, when the distal portion 22A of the button 16A is depressed, the post 50A extends into and engages the switch 24A, resulting in actuation of the switch 24A within the housing 12 of the rearview assembly 10.

Figure 12:
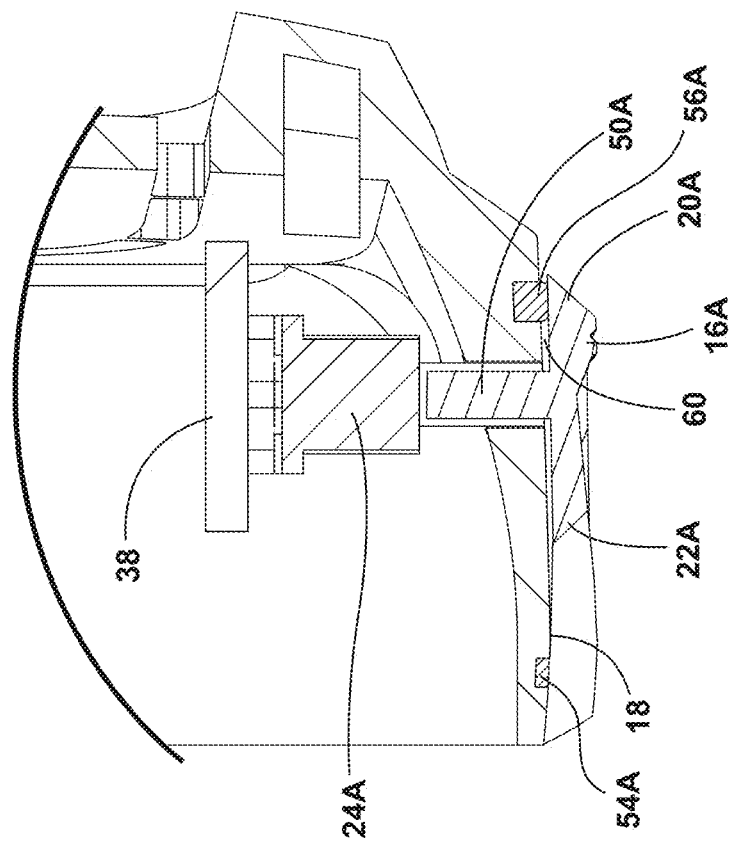
FIG. 12 is an enlarged view of the rearview assembly of FIG. 11 taken at area XII with the button in the unactuated position.
Figure 11:
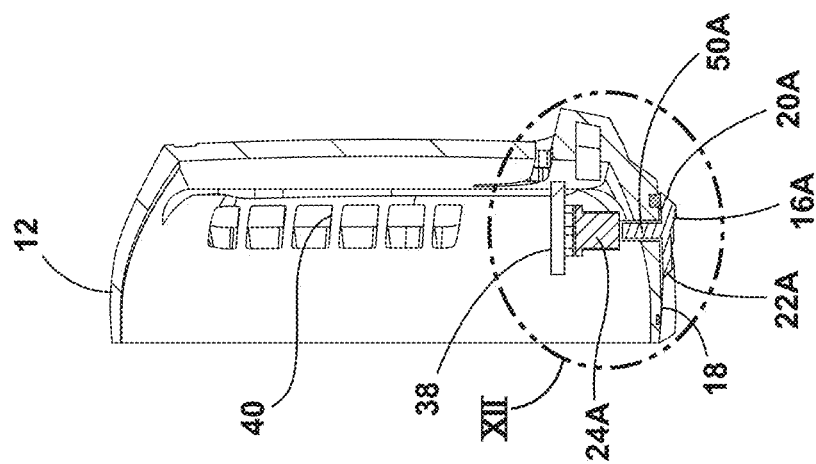
FIG. 11 is a side elevational cross-sectional view of the rearview assembly of FIG. 10 taken at line XI-XI with a button of the rearview assembly in an unactuated position.
Figure 14:
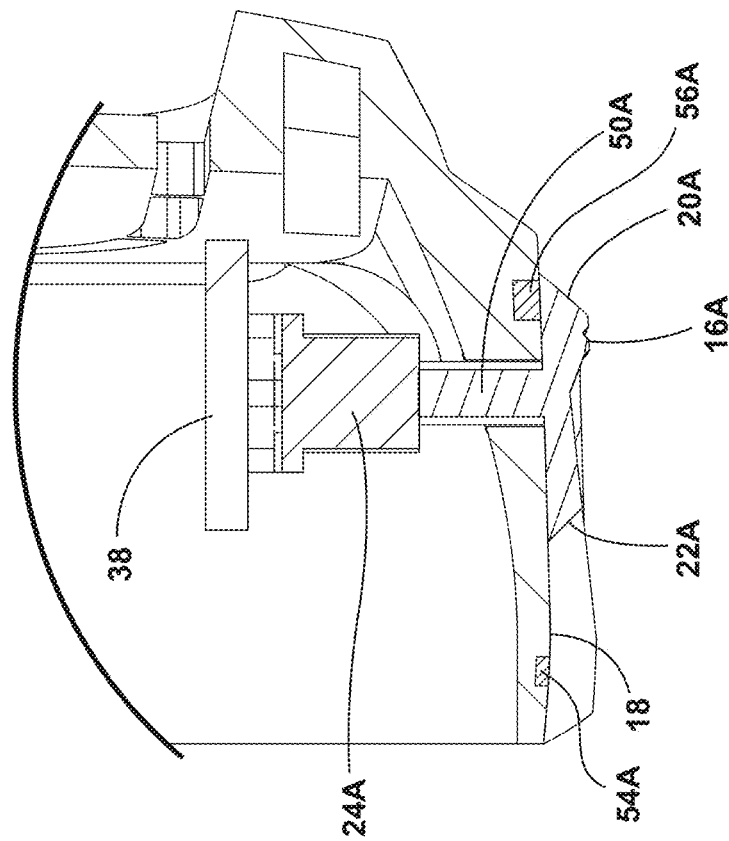
FIG. 14 is an enlarged view of the rearview assembly of FIG. 13 taken at area XIV with the button in the actuated position.
Figure 13:
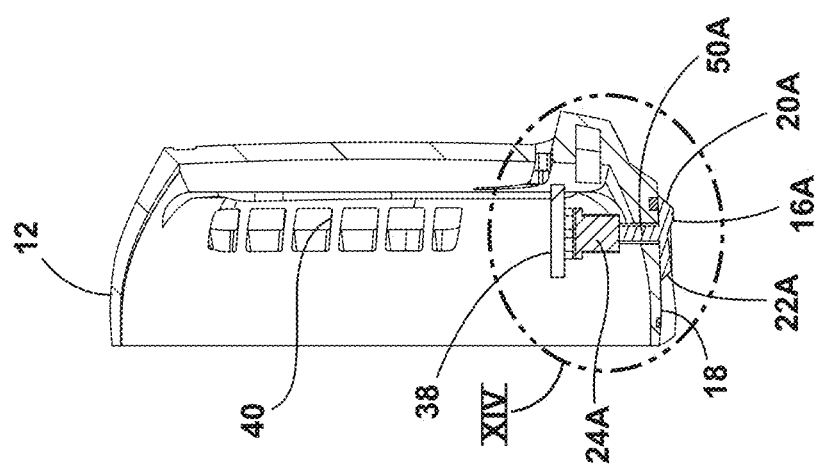
FIG. 13 is a side elevational cross-sectional view of the rearview assembly of FIG. 11 with the button in an actuated position.

With reference now to FIGS. 11-14, the button 16A is operable between a non-actuated position (FIGS. 11 and 12) and an actuated position (FIGS. 13 and 14). Notably, the gap 60 between the button 16A and the bottom side 18 of the housing 12 is eliminated or minimized when the distal portion 22A of the button 16A is depressed. When the button 16A is depressed, the button 16A compresses the second adhesive member 56A, and at the same time, the post 50A is forced against the switch 24A, resulting in the function for that switch being activated. When the user releases the button 16A, the second adhesive member 56A pushes the button 16A back to the unactuated position (FIGS. 11 and 12). Each of the buttons 16B-16F works in a similar fashion. Two or more of the buttons 16A-16F can also be used simultaneously to provide additional functions to the rearview assembly 10. As previously noted, the proximal end 20A of the button 16A is not configured to activate the switch 24A. Consequently, a user can manipulate or otherwise move the rearview assembly 10 without accidentally actuating one of the buttons 16A-16F when the user grasps the housing 12 proximate the proximal end 20A of the button 16A.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
a housing configured to support a bezelless rearview device;
a button disposed on a side of the housing behind the bezelless rearview device and including a proximal end adjacent the rearview device, and a distal portion spaced from the rearview device; and
a switch proximate the distal portion of the button, wherein actuation of the switch activates a function of the rearview device, and wherein a requisite force to actuate the button decreases as the requisite force is moved from the proximal end of the button to the distal portion, wherein the button is in abutting contact with the housing at the proximal end and spaced from the housing by a gap at the distal portion.

2. The rearview assembly of claim 1, wherein the rearview device includes a display module operably coupled with an imager.

3. The rearview assembly of claim 1, further comprising:
a first adhesive strip adjacent the proximal end.

4. The rearview assembly of claim 3, further comprising:
a second adhesive strip adjacent the proximal end.

5. The rearview assembly of claim 4, wherein the second adhesive strip includes a foam material.

6. The rearview assembly of claim 1, wherein the button includes a post that extends through the housing and engages the switch.

7. The rearview assembly of claim 6, wherein the switch includes a receiving portion that receives the post.

8. The rearview assembly of claim 1, wherein the gap size increases gradually from the proximal end to the distal portion.

9. The rearview assembly of claim 1, wherein a circuit board traverses a lower lateral portion of the housing and includes a first side operably coupled with the switch.

10. The rearview assembly of claim 1, wherein the button includes tactile indicia indicating a possible function related to actuation of the button.

11. A rearview assembly comprising:
a bezelless housing configured to support a rearview device, wherein a peripheral edge of a front surface of the rearview device is exposed;
a button assembly, the button assembly including a plurality of buttons disposed on a side of the housing, each of the plurality of buttons including a proximal end adjacent the rearview device, and a distal portion proximate a rear wall of the rearview device; and
a switch assembly, the switch assembly including a plurality of switches proximate the distal portion of each of the plurality of buttons, wherein activation of the switch assembly activates a function of the rearview device, and wherein a requisite force to actuate the button assembly decreases as the requisite force is moved from the proximal end of the each of the plurality of buttons to the distal portion.

12. The rearview assembly of claim 11, wherein the each of the plurality of buttons includes a post that extends through the housing and engages each of the plurality of switches.

13. The rearview assembly of claim 11, wherein a gap is defined between each of the plurality of buttons and a bottom of the housing, and wherein the gap size increases gradually from the proximal end to the distal portion of each of the plurality of buttons.

14. The rearview assembly of claim 11, wherein the switch assembly includes a circuit board traversing a lower wall of the housing, and wherein each of the plurality of switches is operably coupled with the circuit board.

* * * * *